UNITED STATES PATENT OFFICE.

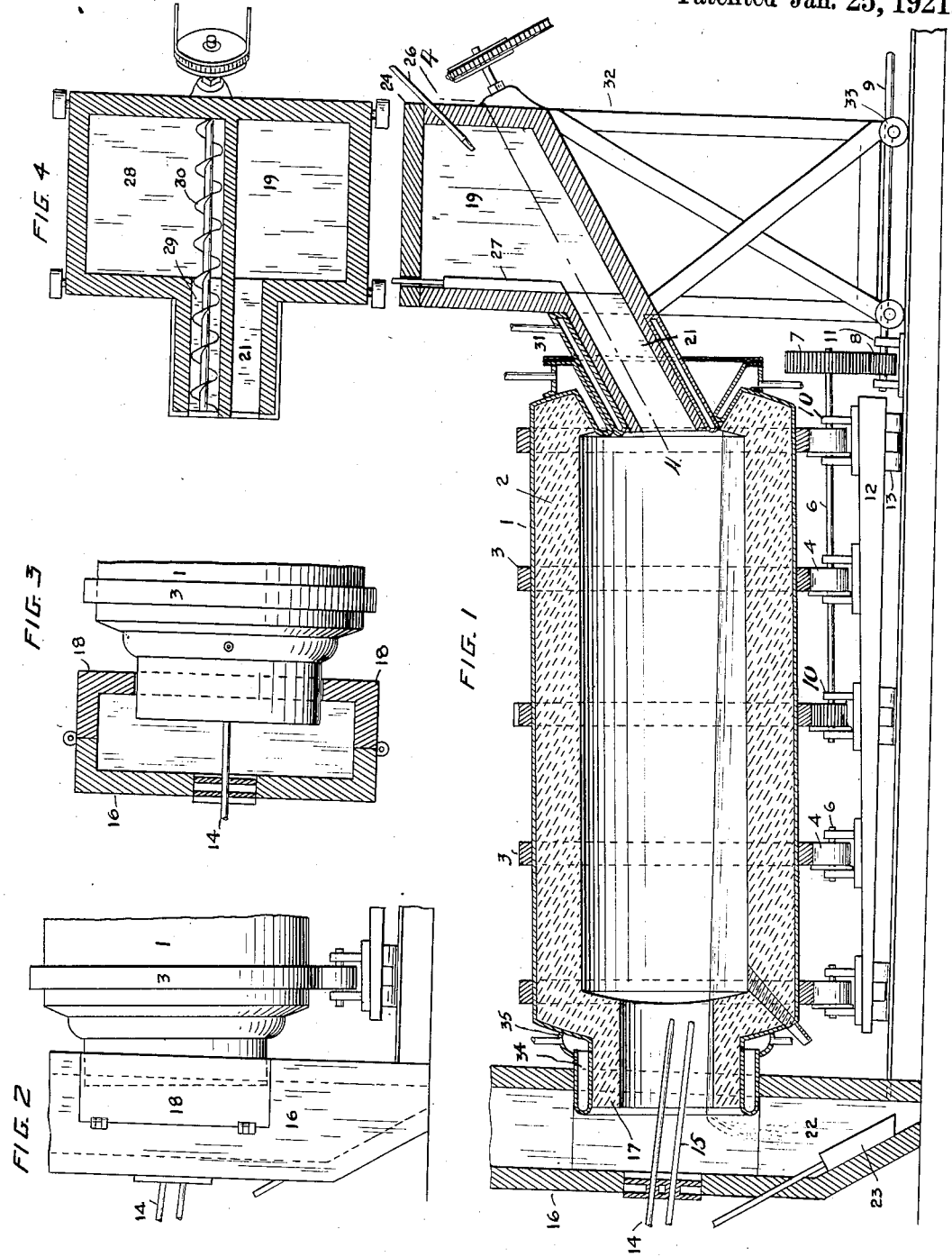

JOEL LUND, OF SAN FRANCISCO, CALIFORNIA.

PROCESS OF AND APPARATUS FOR MAKING SLAG.

1,366,398. Specification of Letters Patent. Patented Jan. 25, 1921.

Original application filed January 10, 1918, Serial No. 211,269. Divided and this application filed April 13, 1918. Serial No. 228,373.

*To all whom it may concern:*

Be it known that I, JOEL LUND, a citizen of the United States, residing at San Francisco, in the county of San Francisco and State of California, have invented new and useful Improvements in Processes of and Apparatus for Making Slag, of which the following is a specification.

The present invention relates to an improved method of and apparatus for purifying, and otherwise qualifying, slag for metallurgical and other purposes and is a division of an application filed by me January 10, 1918, Serial Number 211,269.

In said application are set forth some of the objects of my invention which in that case are specifically applicable in combination with a process and apparatus for the reduction and smelting of ores in rotary furnaces, and which objects are to rapidly and effectually purify the molten slag resultant from said process so that it may be used repeatedly as a flux. Said objects are attained by blowing steam and air on to the molten slag in an internally heated rotating furnace, the slag preferably resting on a molten bath of metal so as to present an extended, yet comparatively thin, body to the steam and air applied thereto. Other objects, and of wider application, are as follows:

1. To retain the heat of the slag and to even increase its temperature, so that, when said slag is transferred to another furnace, the heat of said furnace and of the material therein is thereby increased.

2. To save fuel in metallurgical furnaces, as the slag used as flux is never allowed to cool but is returned to the smelting chamber in a molten heated condition.

3. To qualify said slag to suit the purpose for which it is to be used by adding basic or acid material to the same.

4. To provide an apparatus in which the purification of the slag, the commingling of the added material therewith, and the heating and keeping in fluid condition of the materials involved, may be effectually and speedily carried out.

It is seen then that in this, its wider application, my invention provides an efficient, continuous and economical method of treating slag not only for use in rotary furnaces, such as mentioned, but in other types of furnaces as well, where molten purified slag may be used as a flux and for heating purposes.

Where it is desired to use a purified and otherwise treated slag, either in molten or solid form, for any other purpose, as for instance in making cement or building material from slag, or a fluxing material consisting of purified, porous and coherent blocks of slag, such as shown in my pending application filed Sept. 12, 1917, Serial Number 191,037, my present invention will be found a rapid and economical method and means for treating said slag to the end that it may be used for said purposes.

In the accompanying drawing, Figure 1 is a longitudinal vertical section of my improved apparatus; Fig. 2 is a broken front elevation; Fig. 3 is a transverse section, certain parts being shown in plan view, on the line 3—3 of Fig. 1; Fig. 4 is a detail horizontal section on the line 4—4 of Fig. 1.

Refering to the drawing, 1 indicates a slag furnace, the interior of which is lined with refractory slag-resistant material 2. Said furnace is formed on the outside with a series of rings or wheels 3, which are supported by rollers 4 on shafts 6 rotated by a gear wheel 7, meshing with a pinion 8 on a shaft 9 rotated from any suitable source of power. Said shaft 9 rotates in bearings 11 and shaft 6 is supported in bearings 10 which are supported by a platform 12 which can be moved transversely on rollers 13, so that when desired said furnace can be moved in a direction transverse to its length.

The slag furnace 1 is supplied with fluid or pulverized solid fuel by a burner 14, which enters the furnace at one end thereof. The products of combustion from the furnace 1 after circulating around the entire length of the furnace escape by a chimney 16 at the same end as the burner 14. Air or steam or both is or are introduced into the interior of the furnace 1 by a pipe 15 for the purpose of purifying the slag therein.

The connection between the furnace 1 and the chimney 16 is made by a comparatively narrow neck 17. To permit the slag furnace to be replaced by another after certain periods, the sides of the chimney next to that through which the neck of the furnace enters are each cut away, as shown in Figs. 2, 3, sufficiently to permit the neck to pass transversely through said sides, so that the neck of one slag furnace passes through one of the cut away sides, while that of another slag furnace, which is substituted therefor, passes through the opposite cut away side. These cut away sides are closed, when the furnace is in the proper position, by chimney sections 18.

Slag is supplied into the end of the rotating furnace 1 opposite to the burner 14 by means of a hopper 19 and a chute 21, and overflows from said furnace into a chamber 22 having in its bottom a hole to permit the slag to be discharged, and which is closed by a gate 23. The slag is charged into the hopper 19 through the top, which is afterward closed by a shutter 24. Said slag is maintained hot in said hopper by a burner 26, and a gate 27 limits the rate at which the slag is permitted to escape by a chute 21 from the hopper. A second hopper 28 (see Fig. 4) is located adjacent to the hopper 19 and discharges by a passage 29 into the furnace 1. Basic or acid material, as may be found necessary to properly proportion the slag to render it a more efficient fluxing agent, is contained in said hopper 28 and is conveyed into said furnace as desired by means of a feed screw 30. The chute 21 is maintained comparatively cool by means of a water jacket 31 therearound. Said hoppers 19, 28, are supported upon a suitable frame 32, which can be moved to and from the furnace 1 upon rollers 33.

I provide in the slagging furnace 1 a bottom layer of molten iron, the depth of the molten iron being sufficient only to cover the bottom of said furnace, and not to escape through its neck. The upper layer of slag escapes through the neck, leaving the iron permanently in the vessel. At the end of the furnace 1, adjacent to the burner 14, communicating with the chimney 16, there is provided a water jacket having a stationary wall 35 and a wall 35 moving with the furnace and making a watertight fit with the wall 35.

In operating the furnace, it is preferable, when for any reason it is desirable to add any considerable amount of solid material to the molten slag, to first purify a certain amount of said slag, as much as needed for the purpose, and which may be ascertained by testing samples at intervals, then shutting off the steam and air supply, and afterward adding and melting down the proper amount of qualifying material.

The metallic bath in the furnace is in such case kept sufficiently low that a certain amount of molten slag and qualifying material will yet remain within the furnace while undergoing the afore-mentioned treatment. The process of melting may be watched through a spy hole in the door, and the condition of the slag tested by withdrawing samples.

When the slag has been sufficiently treated as noted, then another batch or certain amount is tapped into the furnace from the hoper 19, and this incoming slag now displaces the slag already in the furnace, in other words, the purified slag runs out through an opening in the furnace and into any receptacle ready to receive the same and the process is repeated.

When only comparatively small quantities of solid matter are added or there is only a small amount of impurities to be eliminated from the slag, or where said slag needs to be only purified, then the process of purifying or of purifying and qualifying may be carried out continuously and simultaneously, the slag being introduced into the furnace as fast as it is brought into proper condition for use, which is ascertained in the manner already noted.

I claim:

1. The process of purifying molten slag which consists in charging the molten slag into a furnace, applying heat to the under surface of said slag, and simultaneously applying a gaseous oxidizing fluid on to the upper surface of said slag.

2. The process of purifying molten slag which consists in charging said slag into a gaseous furnace and applying heat to the under surface of said slag, maintaining said slag in motion, and simultaneously applying a gaseous fluid on to the upper surface of said slag.

3. The process of purifying molten slag which consists in charging the molten slag into a furnace, discharging an oxidizing fluid on to the upper surface of said slag, heating the interior of said furnace, and rotating the furnace to move a heated interior surface thereof beneath the body of molten slag.

4. The process of purifying molten slag which consists in charging the molten slag into a furnace in which a body of molten metal is permanently retained, discharging a gaseous oxidizing fluid on to the upper surface of said slag, heating the interior of said furnace, and rotating the furnace to move a heated interior surface thereof beneath the molten material.

5. The process of purifying and otherwise qualifying molten slag which consists in charging the molten slag into a furnace in which a body of molten metal is permanently retained, discharging an oxidizing fluid on to the upper surface of said slag, heating the interior of said furnace, rotating the furnace to move a heated interior surface thereof beneath the body of molten material, and adding to said slag material for rendering it suitable for the purpose required.

6. The continuous method of purifying and otherwise qualifying molten slag which consists in feeding said slag and material to qualify the same for the purpose required in regulated quantities into a furnace, applying a gaseous oxidizing fluid to the upper surface of said slag, heating the interior of said furnace, rotating the furnace to move a heated interior surface thereof beneath the body of molten slag, and withdrawing the same from the furnace.

7. An apparatus for purifying slag comprising a rotatable furnace having an outlet such that a body of molten material is permanently retained therein below the level of said outlet, means for charging slag into said furnace, means for heating the interior of said furnace, means for discharging an oxidizing fluid into said furnace and on to the molten slag, a chimney for conducting off the products of combustion, located at the same end of the furnace as the heating means, means for drawing off the slag at the same end as the heating means, and means for rotating said furnace.

8. An apparatus for purifying and otherwise qualifying slag comprising a rotatable furnace having an outlet such that a body of molten material is permanently retained therein below the level of said outlet, independent receptacles for slag and for material to be added to said slag to render it suitable for the purpose required, said receptacles communicating with the interior of the furnace, means for heating the interior of said furnace, means for discharging an oxidizing fluid into said furnace and on to said molten slag, means for rotating said furnace, and means for withdrawing the contents of said furnace.

9. An apparatus for purifying and otherwise qualifying slag comprising a rotatable furnace having an inlet at one end so located as to prevent molten material fed into the furnace from escaping through said end, combined hoppers and flues for feeding solid and molten material into the furnace, said flues filling said end, means for heating the interior of the furnace, means for discharging an oxidizing agent on to the molten material in the furnace, means for rotating said furnace, means for preventing the escape of the heated gases through said inlet end and flues, means for regulating the flow of material through said flues, means for heating the material in the hoppers and means for cooling the flues leading into the furnace.

10. An apparatus for purifying and otherwise qualifying slag, comprising a rotatable furnace having an inlet at one end so located as to prevent molten material fed into the furnace from escaping from said end, means for closing the other end of the furnace, combined hoppers and flues for feeding material into the furnace through said inlet, said flues filling the opening through said end, said flues being removable from said end, means for discharging an oxidizing fluid on to the molten material in the furnace, and means for rotating the furnace.

JOEL LUND.